(12) United States Patent
Pilney et al.

(10) Patent No.: US 10,473,258 B2
(45) Date of Patent: Nov. 12, 2019

(54) LOCKING BOOM STAND

(71) Applicant: CNH Industrial America LLC, New Holland, PA (US)

(72) Inventors: Brian Pilney, West Bend, WI (US); Josh Perrone, Sheboygan Falls, WI (US); James Hanke, New Holstein, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/820,850

(22) Filed: Nov. 22, 2017

(65) Prior Publication Data

US 2019/0154189 A1    May 23, 2019

(51) Int. Cl.
| | | |
|---|---|---|
| *F16M 11/04* | (2006.01) | |
| *F16M 11/22* | (2006.01) | |
| *A01B 76/00* | (2006.01) | |
| *A01C 23/00* | (2006.01) | |

(52) U.S. Cl.
CPC ........... *F16M 11/041* (2013.01); *F16M 11/22* (2013.01); *A01B 76/00* (2013.01); *A01C 23/00* (2013.01); *F16M 11/04* (2013.01)

(58) Field of Classification Search
USPC ..... 248/152, 154, 147, 149, 351, 80, 81, 82; 211/22; 269/143, 249, 16, 138, 291
See application file for complete search history.

(56) References Cited

U.S. PATENT DOCUMENTS

| | | | |
|---|---|---|---|
| 484,941 A | * | 10/1892 | Muller |
| 529,827 A | * | 11/1894 | Fonda |
| 591,969 A | * | 10/1897 | Hiekisch |
| 4,029,277 A | * | 6/1977 | Bulanda .............. F16G 11/103 24/132 R |
| 6,296,162 B1 | * | 10/2001 | Englander .............. B60R 9/048 224/323 |
| 7,458,526 B2 | | 12/2008 | Honermann et al. |
| 8,544,885 B2 | | 10/2013 | Lanting et al. |
| 8,985,317 B2 | | 3/2015 | Martin |
| 2005/0281648 A1 | | 12/2005 | Hockenyos et al. |

FOREIGN PATENT DOCUMENTS

| | | |
|---|---|---|
| CN | 202279673 U | 6/2012 |
| CN | 302923579 | 8/2014 |
| GB | 1561008 A | 2/1980 |
| JP | 2011102517 | 5/2011 |
| KR | 100948694 B1 | 3/2010 |

* cited by examiner

*Primary Examiner* — Alfred J Wujciak
(74) *Attorney, Agent, or Firm* — Rebecca L. Henkel; Rickard K. DeMille

(57) ABSTRACT

A locking stand for use with a boom associated with an agricultural machine. The locking stand includes a stand base and a locking arm that is movably attached to the stand base. The stand base may include a stand body with a stand base lower section and a stand base upper section. The lower section is configured to engage a support surface and the upper section supports the sprayer boom arm. The locking arm is movable between an open position for locking the sprayer boom in the locking boom stand. A hook arrangement associated with both the locking arm and the stand base upper section may be used to lock the boom stand relative to the boom. More specifically, the hook arrangement may include a stand base hook associated with the stand base upper section and a locking arm hook associated with the locking arm.

11 Claims, 5 Drawing Sheets

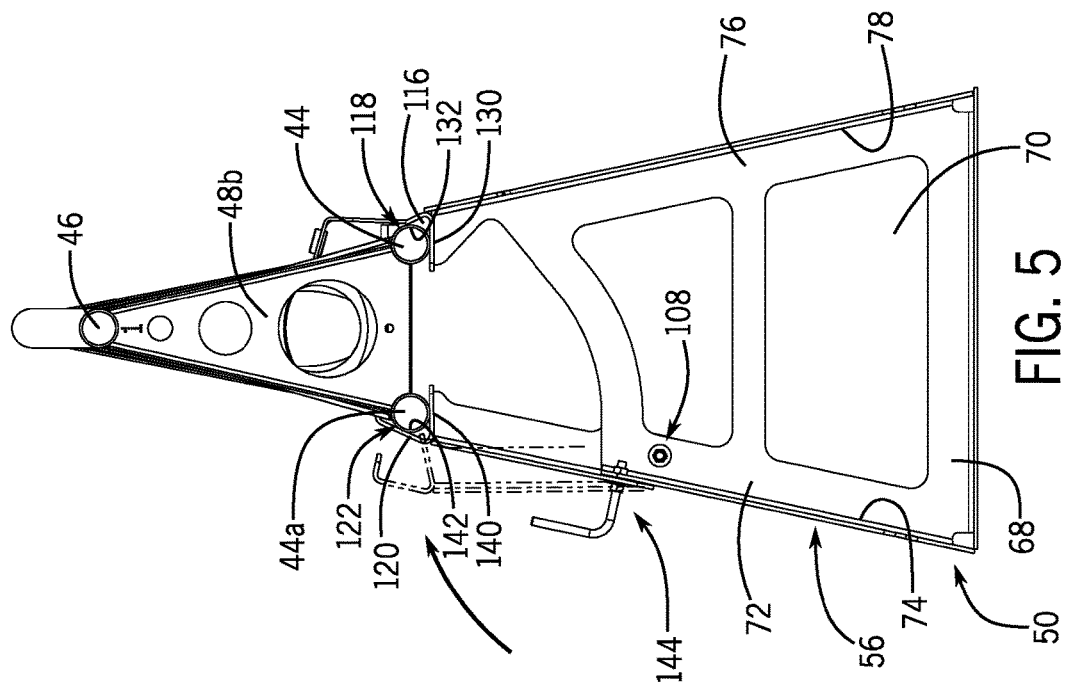
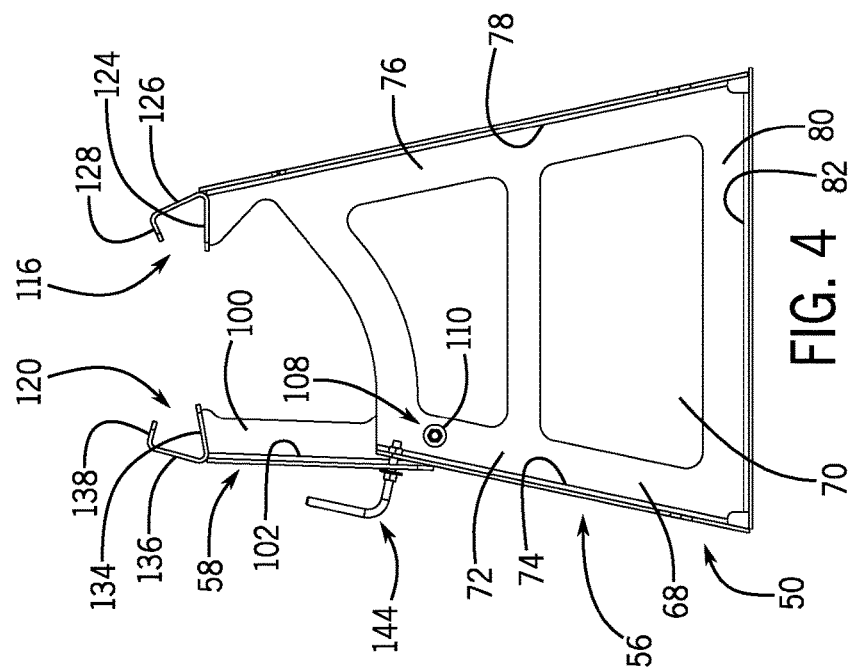

LOCKING BOOM STAND

FIELD OF THE INVENTION

The invention relates generally to agricultural product application equipment or agricultural machines such as self-propelled sprayers and, in particular, to a boom stand with a first weldment and a second weldment where the second weldment is rotatable relative to the first weldment to allow for locking of the boom stand relative to boom stringers or other tubes.

BACKGROUND OF THE INVENTION

High-clearance sprayers are getting larger and more complex to allow for increasing coverage in a single pass, which improves application efficiency. These high-clearance sprayers have complex product delivery and rinse systems along with other engine driven accessories and systems that need inspection and servicing.

To deliver various liquids, the high-clearance sprayer includes sprayer booms that extend outwardly from the base and frame of the machine. Again, to increase the coverage in a single pass, these sprayer booms are usually quite long. Due to the length and the weight of the sprayer booms, it can be difficult to install or uninstall the sprayer boom. Previously, boom stands were available that were very heavy and difficult to secure to the sprayer boom. Due to the difficulties in securing the stand to the boom, the interface between the stand and the boom was not secure. Additionally, previous boom stands required a number of different components that needed to be welded together.

SUMMARY OF THE INVENTION

A locking boom stand for temporarily supporting a sprayer boom of an agricultural machine. The locking boom stand may include a stand base and a locking arm.

According to an aspect of the invention, the stand base defines a stand base body with a stand base lower section and a stand base upper section. The stand base lower section may be configured to engage a support surface when the locking boom stand supports a sprayer boom of an agricultural machine, such as a sprayer. The stand base upper section may be arranged toward the sprayer boom when the locking boom stand supports the sprayer boom. Additionally, the stand base may include a main panel wall, a bottom wall, a front wall, and a rear wall. The main panel wall may include a plurality of openings formed therein. The bottom wall may extend substantially perpendicular to a bottom edge of the main panel. Also, the front wall and rear wall may extend substantially perpendicular to a front edge and a rear edge of the main panel, respectively.

According to another aspect of the invention, the locking arm may be movably attached to the stand base. Additionally, the locking arm may define an open position and a closed position. In the open position, it is configured to receive the spray boom into the locking boom stand. When in the closed position, the sprayer boom is locked into the locking boom stand. Further still, the locking arm may include a locking arm lower section and a locking arm upper section. The locking arm lower section may include a movable attachment between the locking arm and the stand base that is defined at a pivot attachment between the locking arm lower section and the stand base. Also, a locking arm hook may be arranged at the locking arm upper section. As a result, the pivoting of the locking arm with respect to the stand base can move the locking arm hook toward or away from the sprayer boom. Further still, when the locking arm is in the closed position with the locking boom stand supporting the sprayer boom, the locking arm hook may engage a supported component of the sprayer boom. In this instance, the locking arm hook may include a locking arm hook lower wall, a locking arm hook side wall, and a locking arm hook top wall. The locking arm hook lower wall may engage a lower surface of the supported component of the sprayer boom. The locking arm hook side wall may be arranged outwardly of an outer surface of the supported component of the sprayer boom. The locking arm hook top wall may be arranged above the supported component. Furthermore, the locking arm hook top wall may extend at an acute angle relative to a bottom edge of the base stand when the locking arm is in a closed position. Somewhat similarly, the locking arm hook top wall may extend at an acute angle relative to the hook lower wall.

Additionally, according to another aspect of the invention, the locking boom stand includes a hook arrangement. The hook arrangement may be configured to capture the sprayer boom in the locking boom stand when the locking arm is in the closed position. The hook arrangement may include a stand base hook and a locking arm hook. The stand base hook may be arranged at the upper section of the stand base body to engage the sprayer boom at a first location, and the locking arm hook may be arranged at an upper section of the locking arm to engage the sprayer at a second location. Furthermore, at least one of the stand base hook and the locking arm hook may be configured to engage the sprayer boom for self-supporting the locking boom stand from the sprayer boom by hanging to facilitate installation of the locking boom stand to the sprayer boom.

According to yet another aspect of the invention, the sprayer boom may include a supported component that is engaged by at least one of the stand base hook and the locking arm hook when the locking boom stand supports the sprayer boom. At least one of the stand base hook and the locking arm hook may include a hook lower wall that may engage a lower surface of the supported component of the sprayer boom when the locking boom stand supports the sprayer boom. Also, at least one of the stand base hook and the locking arm hook may include a hook side wall that may be arranged outwardly of an outer surface of the supported component of the sprayer boom when the locking boom stand supports the sprayer boom. Further still, at least one of the stand base hook and the locking arm hook may include a hook top wall that is arranged above the supported component when the locking boom stand supports the sprayer boom. The hook top wall may extend at an acute angle relative to the bottom edge of the stand base. Alternatively, the hook top wall may extend at an acute angle relative to the hook lower wall.

According to another aspect of the invention, the stand base may comprise a main panel, a bottom wall, a front wall, a rear wall, and a first hook arrangement extending from the rear wall. The main panel may have a front angled side having a front edge, a rear angled side having a rear edge, a bottom edge extending between the front angled side and the rear angled side, and a plurality of openings formed therein. The bottom wall may be defined by a flange extending perpendicular from the bottom edge. Also, the front wall may be defined by a flange extending perpendicular from the front edge. Additionally, the rear wall may be defined by a flange extending perpendicular from the rear edge.

According to yet another aspect of the invention, the locking arm may have a base member with a front edge. The locking arm may also have a wall that may be defined by a flange extending perpendicular from the front edge. Additionally, a second hook arrangement may extend from the wall.

An additional aspect of the invention relates to how the locking arm may be pivotably rotatable relative to the base stand. More specifically, the locking arm may be pivotably rotatable relative to the base stand between an open position for receiving a sprayer boom and a closed position wherein the stand base supports the sprayer boom. Further still, in the open position, the first hook arrangement may engage a first boom stringer and the second hook arraignment may engage a second boom stringer. A fastener may also be secured to lock the locking arm relative to the stand base. In the closed position, the fastener may be removed to unlock the locking arm relative to the base stand. Similarly, when in the closed position, the first hook mechanism may engage a first tube and the second hook mechanism may engage a second tube. Thereafter, the locking arm may be rotated away from the second boom stringer or tube to disengage the second hook mechanism from the second boom stringer.

According to another aspect of the invention, a first opening may be formed in the main panel and a second opening may be formed in the front wall of the stand base. Additionally, a third opening may be formed in the base of the locking arm and a fourth opening may be formed in the wall of the locking arm. A first bolt may be threaded through the first opening and the third opening that may allow for pivotable movement of the locking arm relative to the main panel. A second bolt may also be threaded through the second opening and the fourth opening to secure the locking arm in place relative to the main panel. The first bolt may extend through the first opening and the third opening and the second bolt may extend through the second opening and the fourth opening along a second plane. Also, the second plane may be substantially perpendicular to the first plane.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 4 is a side elevation view of the locking boom stand of FIGS. 2 and 3;

FIG. 5 is a side elevation view of the locking boom stand of FIGS. 2-4 supporting a boom arm, with a locking arm of the boom stand shown in a first position in solid lines and in a second position in phantom.

DETAILED DESCRIPTION OF THE PREFERRED EMBODIMENTS

Figure 1:
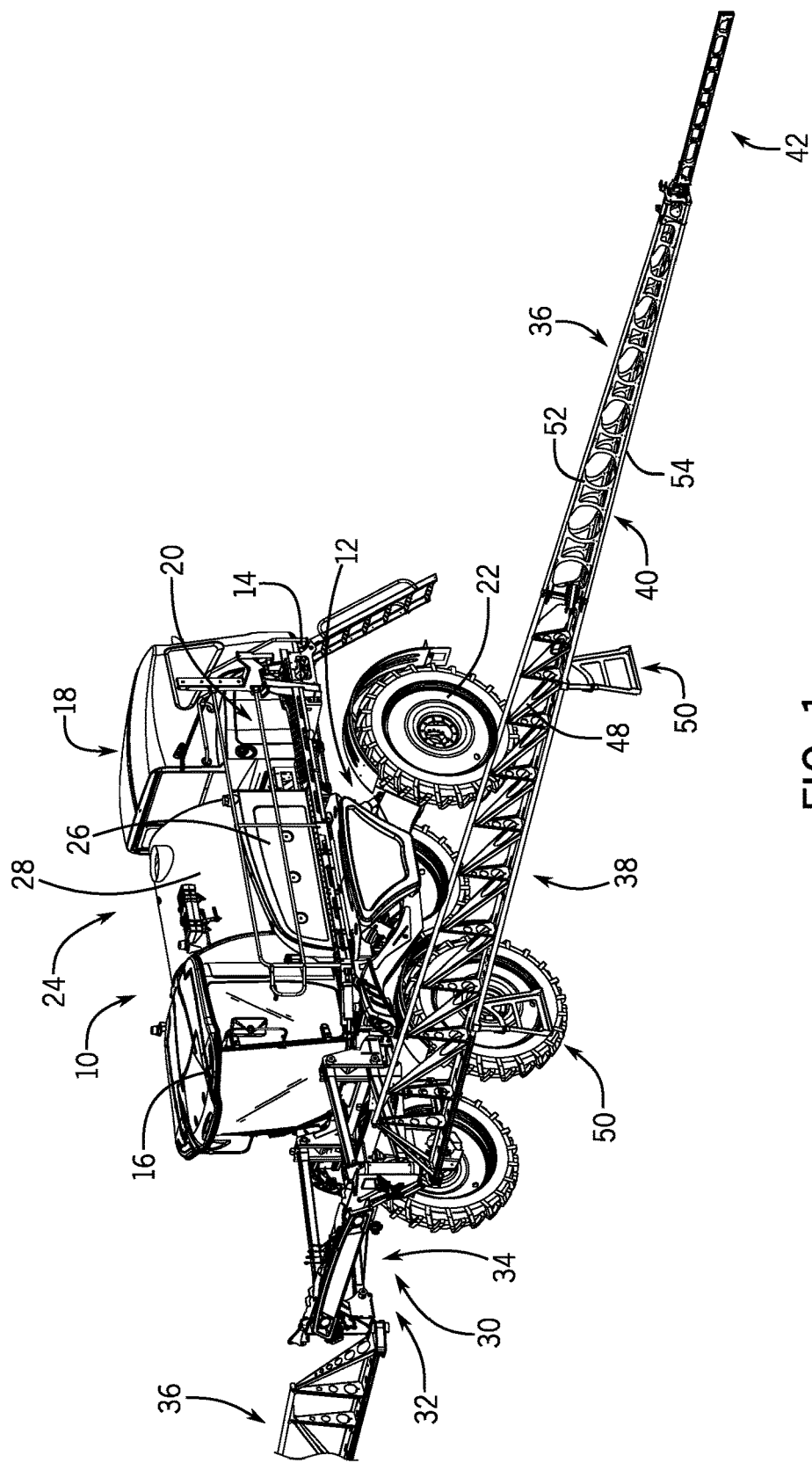
FIG. 1 is an isometric view of an agricultural machine with a locking boom stand that supports a boom arm.
Figure 2:
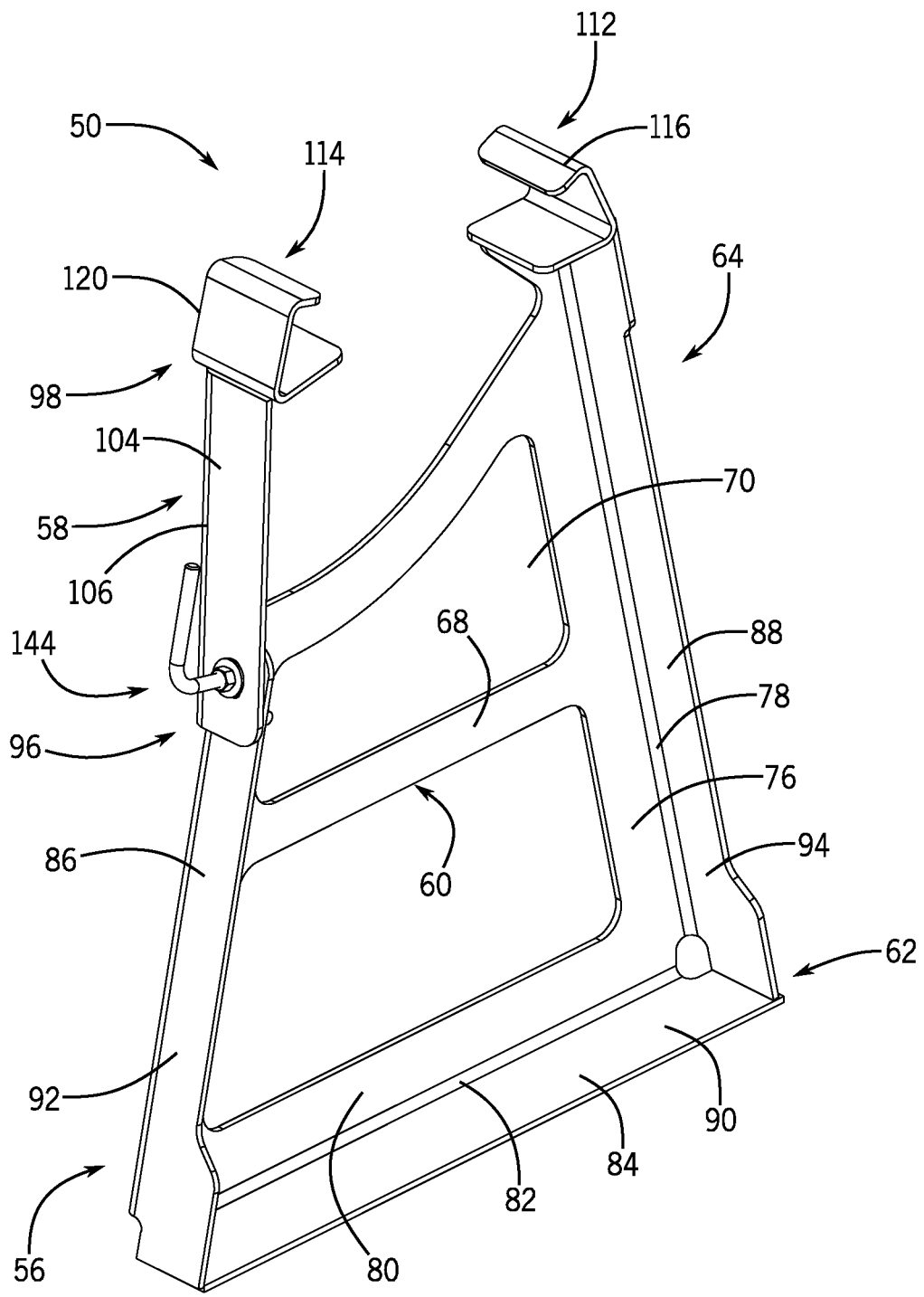
FIG. 2 is an isometric view of the locking boom stand.
Figure 3:
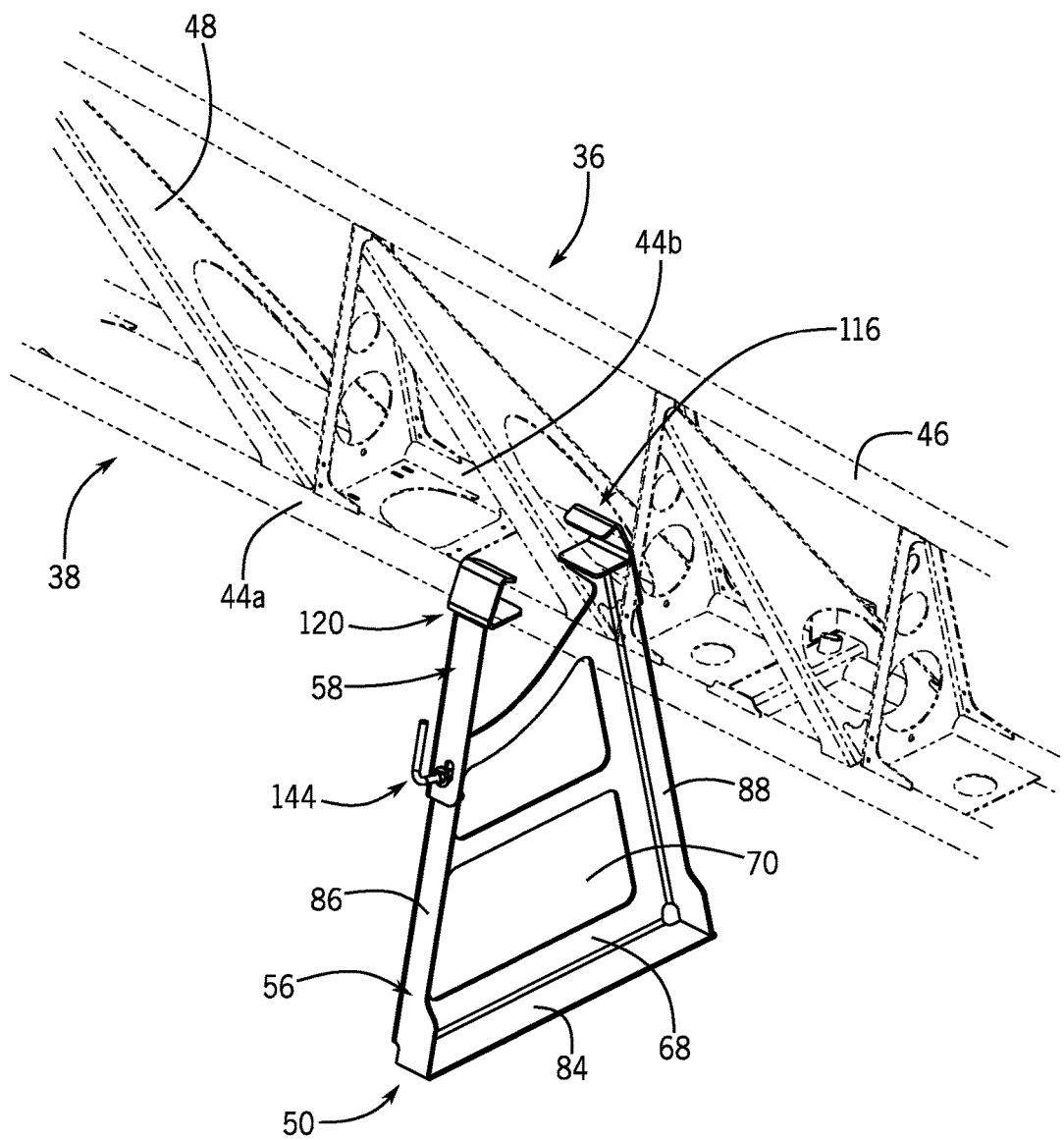
FIG. 3 is an isometric view of the locking boom stand of FIG. 2 supporting a boom arm shown in phantom.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections.

The boom 30 is connected to chassis 12 with a lift arm assembly 32 that is configured to move the boom 30 up and down for adjusting the height of application of the product. The boom 30 includes a center section 34 that is connected to the lift arm assembly 32, with left and right boom arms 36 that are substantially identical to each other and extend in opposite directions from the boom center section 34. Each of the boom arm 36 is shown collectively defined by multiple boom segments that are connected longitudinally to provide the corresponding overall width of the assembled boom 30. The boom segments are shown here as the center section 34 and pairs of primary boom segments 38, secondary boom segments 40, and breakaway boom segments 40 that extend in opposite directions, as mirrored about a longitudinal axis of the sprayer 10. Respective boom segments are hinged to each other to allow the boom 30 to fold into a folded-storage or transport portion and unfold into its extended or unfolded use-position. The various boom segments may define a framework of interconnected stringers and/or other components. As shown here, each of the primary and secondary boom segments 38, 40 may include interconnected stringers, such as a pair of lower stringers 44 and a single upper stringer 46 that provide a generally triangular cross-section to the respective boom section(s). The stringers 44, 46 of the primary boom segments are shown connected to each other with angled trellis brackets 48, whereas the stringers of the secondary boom segments are shown connected to each other with perforated outer walls defined by stringer connected plates 52 with cutouts. FIG. 1 shows one of the primary boom segments 38 supported by a pair of substantially identical locking boom stands 50, with each primary boom segment supported toward its inner end by one locking boom stand 50 and toward its outer end by another locking boom stand 50.

The locking boom stand 50 will now be described. The locking boom stand 50 is configured to temporarily support boom arm 36 associated with the boom 30 including boom stringers 44 that are shown here as long round tubes that extend along the length of each boom section. These boom stringers 44 extend from the boom 30 on either side of the sprayer 10. As known to those of ordinary skill in the art, these boom arm 36 have a long length, such that they extend a significant distance away from the sprayer 10. As a result, the boom arm 36 typically cannot simply be disengaged from the sprayer 10 without first supporting the boom arm 36 along the length of the arms 52. Similarly, the boom arm 36 are preferably supported as the boom arm 36 is attached to the sprayer 10. The inventive locking boom stand 50 serves to support the boom arm 36 during installation or disengagement in a locking manner as will be described below.

As shown in detail in FIGS. 2-6, the locking boom stand 50 includes a stand base 56 and a locking arm 58. The stand base 56 may include a stand base body 60 with a stand base lower section 62 and a stand base upper section 64. The stand base lower section 62 is configured to rest upon or engage a support surface, such as the ground. In this way, the stand base lower section 62 supports the boom arm 36 of the sprayer 10. Additionally, the stand base upper section 64 extends upwardly from the stand base lower section 62. More specifically, the stand base upper section 64 extends upwardly toward the sprayer boom 30 when the locking boom stand 50 supports the boom arm 36.

The stand base 56 may also include a main panel wall 68. As shown, the main panel wall 68 includes a plurality of openings 70 formed therein. These openings 70 allow the amount of material used to manufacture the main panel wall 68 to be minimized, while still ensuring that the main panel wall 68 has sufficient structure to support the sprayer boom 30. By minimizing the amount of materials used to manufacture the main panel wall 68, the cost of materials can similarly be reduced. The main panel wall 68 may also have a front angled side 72 with a front edge 74 as well as a rear angled side 76 having a rear edge 78. Further still, the main panel 68 may have a bottom side 80 that extends between the front angled side 72 and the rear angled side 76 with a bottom edge 82.

Also, the stand base 56 may include a bottom wall 84, a front wall 86, and a rear wall 88. The bottom wall 84 may define a first flange 90 that extends substantially perpendicular to the bottom edge 82 of the main panel wall 68. Similarly, the front wall 86 and the rear wall 88 may define a second flange 92 and a third flange 94, respectively. For instance, the front wall 86 may extend substantially perpendicular to the front edge 74. Moreover, the rear wall 88 may extend substantially perpendicular to the rear edge 78 of the main panel wall 68. Each of the bottom wall 84, front wall 86, and rear wall 88 provide further structural sturdiness to the stand base 56. Furthermore, the bottom wall 84 provides a surface upon which the locking boom stand 50 can rest on the ground.

The locking arm 58 may include a locking arm lower section 96 and a locking arm upper section 98. The locking arm 58 may also include a base member 100 with a front edge 102. Further still, the locking arm 58 may include a wall 104 that defines a flange 106 that extends substantially perpendicular to the front edge 102. The locking arm 58 may also include a movable attachment 108 at the locking arm lower section 96 that connects the locking arm 58 to the stand base 56. More specifically, the movable attachment 108 may be defined at a pivot attachment 110 between the locking arm lower section 96 and the stand base 56. This allows the locking arm 58 to be movably attached to the stand base 56. As such, the locking arm 58 is pivotably movable toward and away from the boom arm 36 between an open position and a closed position. Looking to FIG. 5, in the open position, the locking arm 58 is configured to receive the boom arm 36. In the closed position, the locking arm 58 is locked relative to the sprayer boom 30, such that the boom arm 36 cannot be removed from the locking boom stand 50.

The locking boom stand 50 may also feature a hook arrangement or arrangements 112, 114, which captures the sprayer boom 30 in the locking boom stand 50. More specifically, the hook arrangements 112, 114 captures the boom arm 36 when the locking arm 58 is rotated to the closed position. The hook arrangement may include a first hook arrangement 112 associated with the stand base 56 and a second hook arrangement 114 associated with the locking arm 58. For instance, a stand base hook 116 may be arranged at the stand base upper section 64. The stand base hook 116 may extend from the rear wall 88 of the main panel wall 68. This stand base hook 116 is configured to engage the sprayer boom 30 at a first location 118. Additionally, a locking arm hook 120 may be located at the locking arm upper section 98. This locking arm hook 120 is configured to engage the boom arm 36 at a second location 122. At least one of the stand base hook 116 and the locking arm hook 120 may be configured to engage the boom arm 36 in order to self-support the locking boom stand 50 from the sprayer boom 30 during installation of the locking boom stand 50. For instance, this may be achieved by hanging of the stand base hook 116 or the locking arm hook 120 from the boom arm 36 to facilitate installation of the locking boom stand 50 to the sprayer boom 30.

The stand base hook 116 may include a hook lower wall 124, a hook side wall 126, and a hook top wall 128. The hook lower wall 124 may engage a lower surface 130 of a supported component of the sprayer boom 30, for instance, the first boom stringer 44a, when the locking boom stand 50 supports the sprayer boom 30. Additionally, the hook side wall 126 may be arranged outwardly of an outer surface 132 of the supported component 54a when the locking boom stand 50 supports the sprayer boom 30. The hook top wall 128 may be arranged such that it is located above the supported component 54a when the locking boom stand 50 supports the sprayer boom 30. For instance, the hook top wall 128 may extend at an acute angle relative to the bottom edge 82 of the stand base 56. Furthermore, the hook top wall 128 may extend at an acute angle relative to the bottom edge 82 of the stand base 56 when the locking arm 58 is in the closed position. Alternatively, the hook top wall 128 may extend at an acute angle relative to the hook lower wall 124.

Similarly, the locking arm hook 120 may also include a hook lower wall 134, a hook side wall 136, and a hook top wall 138. Again, the hook lower wall 134 may engage a lower surface 140 of the supported component, for instance, the second boom stringer 44b, of the sprayer boom 30 when the locking boom stand 50 supports the sprayer boom 30. Additionally, the hook side wall 136 may be arranged outwardly of an outer surface 142 of the supported component 54b when the locking boom stand 50 supports the boom arm 36. Furthermore, the hook top wall 138 may be arranged such that it is located above the supported component 54b when the locking boom stand 50 supports the boom arm 36. As such, at least one of the stand base hook 116 and the locking arm hook 120 or both of the hooks 116, 120 may engage a supported component 54a, 54b of the sprayer boom 30.

Figure 6:
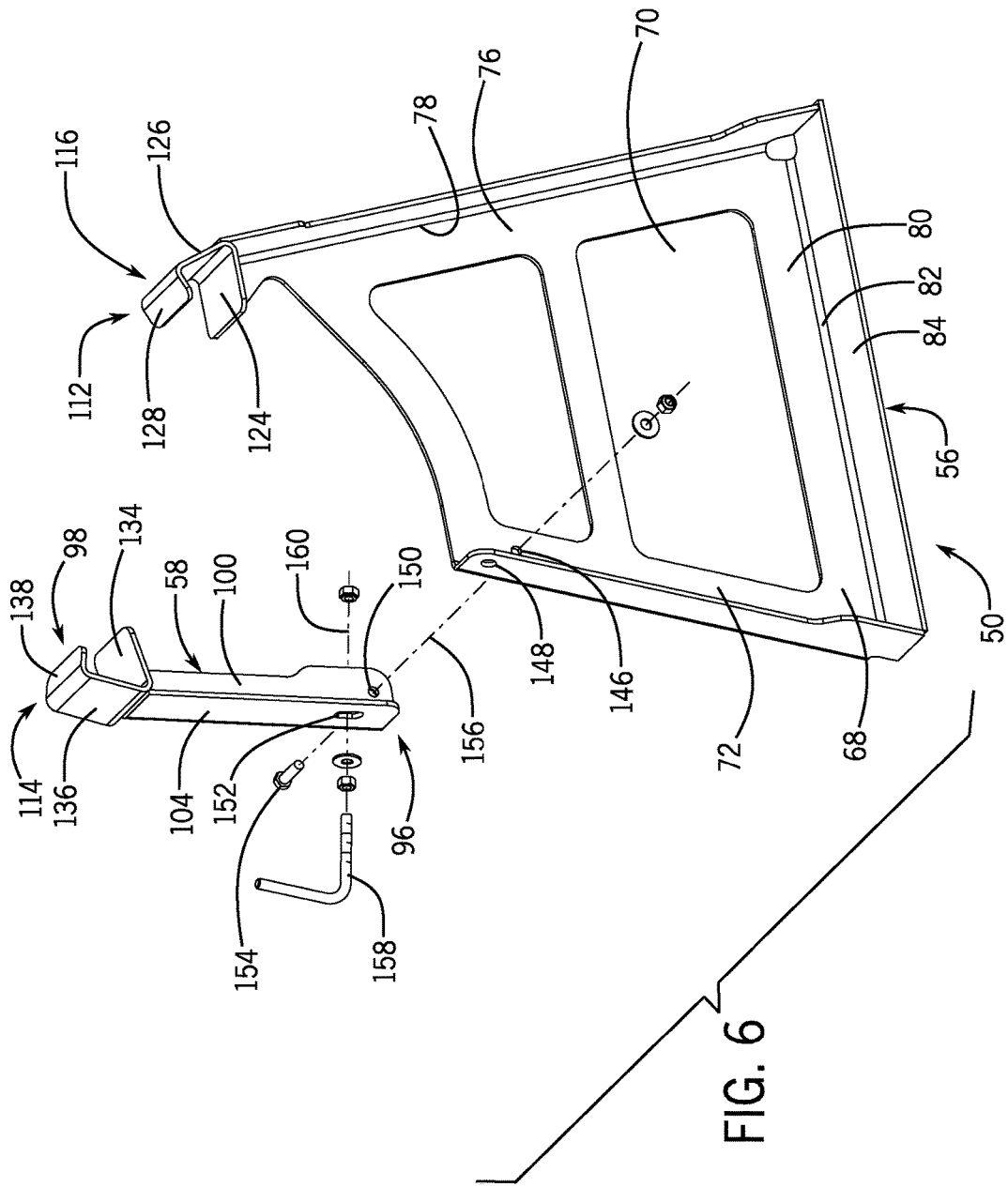
FIG. 6 is an exploded isometric view of the locking boom stand.

Additionally, the locking boom stand 50 may have a locking mechanism or fastener system 144 that allows the locking arm 58 to be secured in place relative to the stand base 56. For instance, the locking mechanism or fastener system 144 may include a number of openings and a number of bolts or other fasteners threaded therethrough as will further be described. As shown in FIG. 6, a first opening 146 may be formed in the main panel wall 68 of the stand base 56. Additionally, a second opening 148 may be formed in the front wall 86 of the stand base 56. Furthermore, a third opening 150 may be formed in the base member 100 of the locking arm 58. Further still, a fourth opening 152 may be formed in the wall 104 of the locking arm 58. The first opening 146 and the third opening 150 may be aligned and a bolt or other pivotable member 154 could be inserted into these openings 146, 150 to allow for pivotable movement of the locking arm 58 relative to the main panel wall 68 of the stand base 56. This first bolt or other pivotable member 154 that is inserted into the first and third openings 146, 150 may extend along a first plane 156. Additionally, the second opening 148 and the fourth opening 152 may be aligned, with a bolt or other fastener 158 inserted into these openings 148, 152 to temporarily secure the locking arm 58 to the stand base 56 once the hook arrangements 112, 114 are arranged to support the boom arm 36. This second bolt or other fastener 158 that extends through the second opening 148 and the fourth opening 152 may extend along a second plane 160. The first plane 156 may be substantially perpendicular to the second plane 160.

Again, as described above the locking arm 58 is pivotably rotatable relative to the stand base 56 between a first position and a second position. More specifically, in the first position, the stand base hook 116 engages a first boom stringer or tube 54a and the locking arm hook 120 engages a second boom stringer or tube 54b opposite the first boom stringer or tube 54a. Additionally, in the first position the second bolt or other fastener 158 is secured in the second opening 148 and the fourth opening 152 to lock the locking arm 58 relative to the stand base 56. As the second bolt 158 is tightened, the boom stand 50 pinches the hook arrangements to secure the stand 50 to the boom 30. In the second position, the second bolt 158 is removed from the second opening 148 and the fourth opening 152 to unlock the locking arm 58 relative to the stand base 56. Thereafter, the locking arm 58 may be rotated away from the second boom stringer 44b about the bolt or other pivotable member 154 that is inserted into the first and third openings 146, 148 to disengage the second hook arrangements 114 from the second boom stringer 44b. Alternatively still, in the second position, the locking arm 58 may be slightly loosened relative to the second boom stringer 44b, which allows the locking boom stand 50 to be moved outwardly from the primary boom segment until the locking arm 58 can clear the second boom stringer 44b, for instance at the secondary boom segment 40 or the breakaway boom segment 42.

Both the stand base 56 and the locking arm 58 may be made of a simple sheet metal design. For instance, the stand base 56 may be a first simple weldment and the locking arm 58 may also be a second simple weldment. Use of such materials results in an affordable locking boom stand 50 that also is easier to make and easier to install by simplifying attachment of the locking boom stand 50 to the boom stringers 44. Additionally, the pivotable nature of the locking arm 58 allows the locking boom stand 50 to more securely attach the locking boom stand 50 to the boom 30.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A locking boom stand for temporarily supporting a sprayer boom of an agricultural sprayer, the locking boom stand comprising:
   a stand base that defines a stand base body that includes,
      a stand base lower section that is configured to engage a support surface when the locking boom stand supports a sprayer boom of an agricultural sprayer; and
      a stand base upper section that is arranged toward the sprayer boom when the locking boom stand supports the sprayer boom;
   a locking arm that is movably attached to the stand base and defines an open position for receiving the sprayer boom into the locking boom stand and a closed position for locking the sprayer boom in the locking boom stand; and
   a hook arrangement configured to capture the sprayer boom in the locking boom stand when the locking arm is in the closed position;
   wherein:
      the hook arrangement includes:
         a stand base hook arranged at the upper section of the stand base body to engage the sprayer boom at a first location; and
         a locking arm hook arranged at an upper section of the locking arm to engage the sprayer boom at a second location;
      the sprayer boom defines a supported component that is engaged by at least one of the stand base hook and the locking arm hook when the locking boom stand supports the sprayer boom and wherein the at least one of the stand base hook and the locking arm hook includes:
         a hook lower wall that engages a lower surface of the supported component of the sprayer boom when the locking boom stand supports the sprayer boom;
         a hook side wall that is arranged outwardly of an outer surface of the supported component of the sprayer boom when the locking boom stand supports the sprayer boom; and
         a hook top wall that is arranged above the supported component when the locking boom stand supports the sprayer boom.

2. The locking boom stand of claim 1, wherein the hook top wall extends at an acute angle relative to a bottom edge of the stand base.

3. The locking boom stand of claim 2, wherein the hook top wall extends at an acute angle relative to the hook lower wall.

4. A locking boom stand for temporarily supporting a sprayer boom of an agricultural sprayer, the locking boom stand comprising:
  a stand base that defines a stand base body that includes,
    a stand base lower section that is configured to engage a support surface when the locking boom stand supports a sprayer boom of an agricultural sprayer; and
    a stand base upper section that is arranged toward the sprayer boom when the locking boom stand supports the sprayer boom;
  a locking arm that is movably attached to the stand base and defines an open position for receiving the sprayer boom into the locking boom stand and a closed position for locking the sprayer boom in the locking boom stand; and
  a hook arrangement configured to capture the sprayer boom in the locking boom stand when the locking arm is in the closed position;
wherein:
  the hook arrangement includes:
    a stand base hook arranged at the upper section of the stand base body to engage the sprayer boom at a first location; and
    a locking arm hook arranged at an upper section of the locking arm to engage the sprayer boom at a second location;
  the locking arm includes:
    a locking arm lower section with a movable attachment between the locking arm and the stand base defined at a pivot attachment between the locking arm lower section and the stand base; and
    a locking arm upper section with the locking arm hook arranged at the locking arm upper section so that pivoting the locking arm with respect to the stand base moves the locking arm hook toward or away from the sprayer boom;
  when the locking arm is in the closed position with the locking boom stand supporting the sprayer boom, the locking arm hook engages a supported component of the sprayer boom and the locking arm hook defines:
    a locking arm hook lower wall that engages a lower surface of the supported component of the sprayer boom;
    a locking arm hook side wall that is arranged outwardly of an outer surface of the supported component of the sprayer boom; and
    a locking arm hook top wall that is arranged above the supported component.

5. The locking boom stand of claim 4, wherein the locking arm hook top wall extends at an acute angle relative to a bottom edge of the stand base when the locking arm is in the closed position.

6. The locking boom stand of claim 4, wherein the locking arm hook top wall extends at an acute angle relative to the hook lower wall.

7. A locking boom stand for temporarily supporting a sprayer boom of an agricultural machine, the locking boom stand comprising:
  a stand base comprising:
    a main panel with front angled side having a front edge, a rear angled side having a rear edge, a bottom edge extending between the front angled side and the rear angled side, and a plurality of openings formed therein;
    a bottom wall defined by a flange extending perpendicular from the bottom edge;
    a front wall defined by a flange extending perpendicular from the front edge;
    a rear wall defined by a flange extending perpendicular from the rear edge;
    a first hook arrangement extending from the rear wall;
  a locking arm comprising:
    a base member with a front edge;
    a wall defined by a flange extending perpendicular from the front edge;
    a second hook arrangement extending from the wall;
wherein:
  the locking arm is pivotably rotatable relative to the stand base;
  the locking arm is pivotably rotatable relative to the stand base between:
    a first position where:
      the first hook arrangement engages a first boom stringer;
      the second hook arrangement engages a second boom stringer; and
      a fastener is secured to lock the locking arm relative to the stand base; and
    a second position where:
      the fastener is removed to unlock the locking arm relative to the stand base; and
      the locking arm is rotated away from the second boom stringer to disengage the second hook mechanism from the second boom stringer.

8. A locking boom stand for temporarily supporting a sprayer boom of an agricultural machine, the locking boom stand comprising:
  a stand base comprising:
    a main panel with front angled side having a front edge, a rear angled side having a rear edge, a bottom edge extending between the front angled side and the rear angled side, and a plurality of openings formed therein;
    a bottom wall defined by a flange extending perpendicular from the bottom edge;
    a front wall defined by a flange extending perpendicular from the front edge;
    a rear wall defined by a flange extending perpendicular from the rear edge;
    a first hook arrangement extending from the rear wall;
  a locking arm comprising:
    a base member with a front edge;
    a wall defined by a flange extending perpendicular from the front edge;
    a second hook arrangement extending from the wall;
  a first opening formed in the main panel;
  a second opening formed in the front wall of the stand base;
  a third opening formed in the base member;
  a fourth opening formed in the wall of the locking arm;
  a first bolt threaded through the first opening and the third opening to allow for pivotable movement of the locking arm relative to the main panel; and
  a second bolt threaded through the second opening and the fourth opening to secure the locking arm in place relative to the main panel;
wherein the locking arm is pivotably rotatable relative to the stand base.

9. The locking boom stand of claim 8, wherein the first bolt extends through the first opening and the third opening along a first plane;

wherein the second bolt extends through the second opening and the fourth opening along a second plane; and wherein the second plane is substantially perpendicular to the first plane.

10. The locking boom stand of claim 8, further comprising:

a closed position where:

the first hook mechanism engages a first tube;

the second hook mechanism engages a second tube; and the second bolt is secured through the second opening and a fourth opening; and an open position where:

the second bolt is removed from the second opening and the fourth opening; and the locking arm is rotated away from the second tube to disengage the second hook form the second tube.

11. A locking boom stand for temporarily supporting a sprayer boom of an agricultural sprayer, the locking boom stand comprising:

a stand base that defines a stand base body that includes:

a stand base lower section that is configured to engage a support surface when the locking boom stand supports a sprayer boom of an agricultural sprayer;

a stand base upper section that is arranged toward the sprayer boom when the locking boom stand supports the sprayer boom;

a first hook arrangement associated with the stand base upper section; and a locking arm with a second hook arrangement, the locking arm movably attached to the stand base and defining an open position for receiving the sprayer boom into the locking boom stand and a closed position for locking the sprayer boom in the locking boom stand;

wherein each of the first hook arrangement and the second hook arrangement includes:

a hook lower wall that engages a lower surface of the supported component of the sprayer boom when the locking boom stand is in the closed position;

a hook side wall that is arranged outwardly of an outer surface of the supported component of the sprayer boom when the locking boom stand is in the closed position; and a hook top wall that is arranged above the supported component when the locking boom stand is in the closed position.

\* \* \* \* \*